US 8,948,594 B2

(12) United States Patent
Weitz et al.

(10) Patent No.: US 8,948,594 B2
(45) Date of Patent: *Feb. 3, 2015

(54) ENHANCED PASSIVE OPTICAL NETWORK (PON) PROCESSOR

(75) Inventors: Eliezer Weitz, Holon (IL); Gil Levy, Herzliya (IL); David Avishai, Nes Ziona (IL); Eli Elmoalem, Nili (IL); Moti Kurnick, Ramat Hasharon (IL); Gal Sitton, Netanya (IL)

(73) Assignee: Broadcom Corporation, Irvine, CA (US)

( * ) Notice: Subject to any disclaimer, the term of this patent is extended or adjusted under 35 U.S.C. 154(b) by 698 days.

This patent is subject to a terminal disclaimer.

(21) Appl. No.: 12/616,553

(22) Filed: Nov. 11, 2009

(65) Prior Publication Data

US 2010/0067908 A1  Mar. 18, 2010

Related U.S. Application Data

(63) Continuation of application No. 11/238,022, filed on Sep. 29, 2005, now Pat. No. 7,643,753.

(51) Int. Cl.
*H04J 14/08* (2006.01)
*H04B 10/272* (2013.01)
*H04L 12/861* (2013.01)
*H04Q 11/00* (2006.01)

(52) U.S. Cl.
CPC ............ *H04L 49/9094* (2013.01); *H04L 49/90* (2013.01); *H04L 49/9073* (2013.01); *H04Q 11/0067* (2013.01); *H04Q 11/0071* (2013.01)
USPC ............................................ 398/67; 398/100

(58) Field of Classification Search
CPC ................................ H04J 14/086; H04J 14/08

USPC ..................................................... 398/67, 100
See application file for complete search history.

(56) References Cited

U.S. PATENT DOCUMENTS

| 5,404,463 | A  | 4/1995  | McGarvey       |
|-----------|----|---------|----------------|
| 5,930,262 | A  | 7/1999  | Sierens et al. |
| 6,229,788 | B1 | 5/2001  | Graves et al.  |
| 6,330,584 | B1 | 12/2001 | Joffe et al.   |
| 6,385,366 | B1 | 5/2002  | Lin            |
| 6,519,255 | B1 | 2/2003  | Graves         |
| 6,546,014 | B1 | 4/2003  | Kramer et al.  |
| 6,934,781 | B2 | 8/2005  | Stone et al.   |
| 7,171,604 | B2 | 1/2007  | Sydir et al.   |
| 7,370,127 | B2 | 5/2008  | Avishai et al. |
| 7,372,854 | B2 | 5/2008  | Kang et al.    |

(Continued)

OTHER PUBLICATIONS

Motorola, Inc., "MPC8260 PowerQUICC II (TM) User's Manual", MPC8260UM/D Rev. 0, printed Apr. 1999, pp. 4-1 to 4-45.

(Continued)

*Primary Examiner* — Shi K Li
(74) *Attorney, Agent, or Firm* — Sterne, Kessler, Goldstein & Fox P.L.L.C.

(57) ABSTRACT

A method for processing data flows of a plurality of passive optical network (PON) operating modes, the method is performed by an optical network unit (ONU). The method comprises processing upstream data flows of said plurality of PON operating modes; and processing downstream data flows of the plurality of PON operating modes. The plurality of PON operating modes include at least a Gigabit PON (GPON) mode, a broadband PON (BPON) mode, and an Ethernet PON (EPON).

16 Claims, 7 Drawing Sheets

(56) References Cited

U.S. PATENT DOCUMENTS

| | | |
|---|---|---|
| 7,385,995 B2 * | 6/2008 | Stiscia et al. ............... 370/412 |
| 7,428,385 B2 | 9/2008 | Lee et al. |
| 7,567,567 B2 | 7/2009 | Muller et al. |
| 7,609,967 B2 | 10/2009 | Hochbaum et al. |
| 7,643,753 B2 | 1/2010 | Weitz et al. |
| 7,739,479 B2 | 6/2010 | Bordes et al. |
| 7,924,870 B2 * | 4/2011 | Bashan et al. ............... 370/462 |
| 2003/0058505 A1 | 3/2003 | Arol et al. |
| 2003/0137975 A1 * | 7/2003 | Song et al. ............... 370/353 |
| 2004/0136712 A1 | 7/2004 | Stiscia et al. |
| 2004/0202470 A1 | 10/2004 | Lim et al. |
| 2004/0208631 A1 | 10/2004 | Song et al. |
| 2004/0218534 A1 | 11/2004 | Song et al. |
| 2004/0264961 A1 | 12/2004 | Nam et al. |
| 2005/0165985 A1 | 7/2005 | Vangal et al. |
| 2005/0276283 A1 | 12/2005 | Gyselings et al. |
| 2006/0209849 A1 * | 9/2006 | Rodrigo ............... 370/401 |
| 2006/0256804 A1 | 11/2006 | Kawarabata et al. |
| 2007/0019956 A1 * | 1/2007 | Sorin et al. ............... 398/71 |
| 2007/0074218 A1 | 3/2007 | Levy et al. |
| 2007/0109974 A1 * | 5/2007 | Cutillo et al. ............... 370/254 |
| 2007/0195824 A9 * | 8/2007 | Chapman et al. ............... 370/490 |

OTHER PUBLICATIONS

Kamil, A., "Notes for CS162," University of California, Berkeley, Spring 2004, Discussions 2, 3, and 4 (2004).

* cited by examiner

US 8,948,594 B2

ENHANCED PASSIVE OPTICAL NETWORK (PON) PROCESSOR

CROSS-REFERENCE TO RELATED APPLICATIONS

The present application is a continuation application of a U.S. patent application Ser. No. 11/238,022 filed on Sep. 29, 2005, now U.S. Pat. No. 7,643,753. The contents are incorporated herein by reference.

FIELD OF THE INVENTION

The present invention relates generally to communication using broadband passive optical networks (PONs), and more particularly to implementing PON processing on a single integrated circuit.

BACKGROUND OF THE INVENTION

As the demand from users for bandwidth is rapidly increasing, optical transmission systems, where subscriber traffic is transmitted using optical networks, is installed to serve this demand. These networks are typically referred to as fiber-to-the-curb (FTTC), fiber-to-the-building (FTTB), fiber-to-the-premise (FTTP), or fiber-to-the-home (FTTH). Each such network provides an access from a central office (CO) to a building, or a home, via optical fibers installed near or up to the subscribers' locations. As the transmission quantity of such an optical cable is much greater than the bandwidth actually required by each subscriber, a passive optical network (PON), shared between a plurality of subscribers through a splitter, was developed.

An exemplary diagram of a typical PON 100 is schematically shown in FIG. 1. The PON 100 includes M optical network units (ONUs) 120-1, 120-2, through 120-M, coupled to an optical line terminal (OLT) 130 via a passive optical splitter 140. To the extent that reference is made to the ONUs without regard to a specific one thereof, such ONUs will be referenced as 120. Traffic data transmission may be achieved by using asynchronous transfer mode (ATM) cells over two optical wavelengths, one for the downstream direction and another for the upstream direction. Downstream transmission from OLT 130 is broadcast to all ONUs 120. Each ONU 120 filters its respective data according to, for example, pre-assigned ATM VPI/VCI values. ONUs 120 transmit respective data to OLT 130 during different time slots allocated by OLT 130 for each ONU 120. Splitter 140 splits a single line into multiple lines, for example, 1 to 32, or, in case of a longer distance from OLT 130 to ONUs 120, 1 to 16.

In the related art, PONs are classified into one of the following: an ATM PON (APON), a broadband PON (BPON), an Ethernet PON (EPON or GE-PON), and a Gigabit PON (GPON). The APON uses the ATM protocol; the BPON is designed to provide broadband services over an ATM protocol; the EPON accommodates an Ethernet protocol; and the GPON is utilized when accommodating both the ATM protocol and the Ethernet protocol. Each type of PON is a standardized technology as detailed in Table 1.

TABLE 1

| PON Type | Standard |
|---|---|
| BPON | ITU-T G.983.x |
|  | ITU-T G.983.3 |
| EPON | IEEE 802.3ah |
| GPON | ITU-T G.984.2 |

OLT 130 and ONUs 120 provide the interface between the optical network and homes or businesses, and thus define the type of the PON. For example, in order to establish a BPON the OLT 130 and ONUs 120 should be compatible with the BPON standards, i.e., ITU-T-G.983.X series. Specifically, an ONU includes a PON processor utilized to receive downstream traffic from an OLT, and provide the contents of the downstream traffic to one or more subscriber devices. Similarly, the processor of the ONU is deigned to receive and transmit upstream data from the one or more subscriber devices to the OLT via the passive optical network. An example of such PON processor may be found in U.S. patent application Ser. No. 10/340,635 entitled "Integrated PON processor" which is incorporated herein by reference for its useful background description of the state of the art heretofore.

A limitation of PON processors known in the art is the inability to operate in multiple PON modes. For example, the PON processor described in US Patent Application Publication No. 2004/0136712 is compliant only with the ITU G.983.X recommendations. This requires from service providers additional investments in infrastructure when upgrading their PONs, for example, from EPON to GPON.

Therefore, in the view of the limitations introduced in the prior art it would be advantageous to provide an enhanced PON processor adapted to operate in a mixed-mode. It would be further advantageous if the PON processor were compatible with the GPON standard.

SUMMARY OF THE INVENTION

Certain embodiments of the invention include a method for processing data flows of a plurality of passive optical network (PON) operating modes. The method comprises processing upstream data flows of said plurality of PON operating modes; and processing downstream data flows of said plurality of PON operating modes.

BRIEF DESCRIPTION OF THE DRAWINGS

In order to understand the invention and to see how it may be carried out in practice, an embodiment will now be described, by way of non-limiting example only, with reference to the accompanying drawings, in which.

DETAILED DESCRIPTION OF EXEMPLARY EMBODIMENTS

Figure 1:
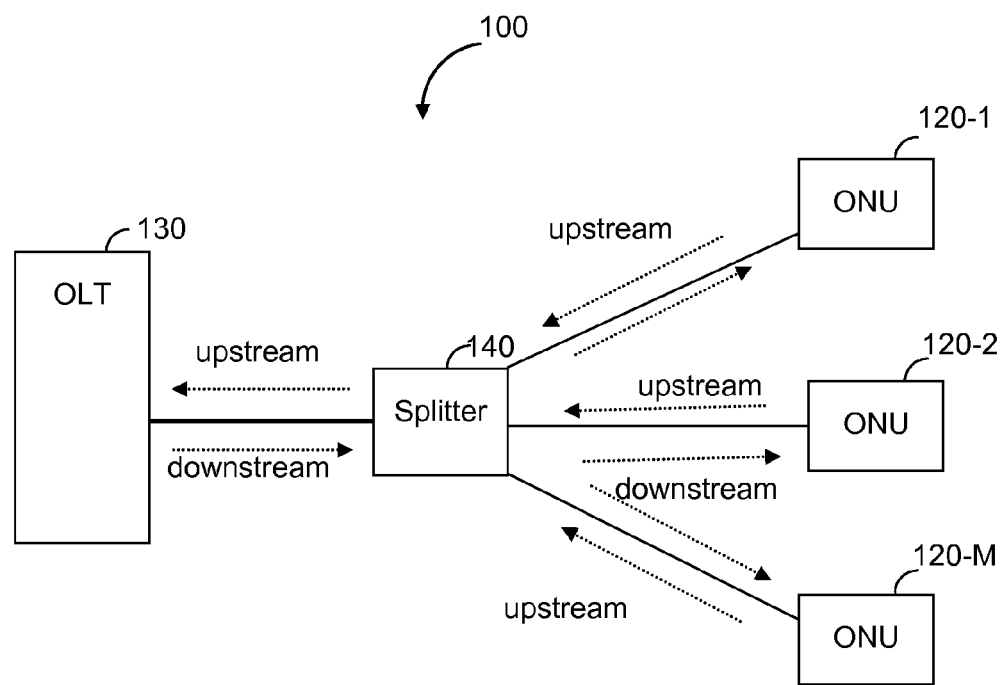
FIG. 1 is an exemplary diagram of a PON.

In the following description, reference will be made to devices of which more than one are referenced in the drawings by a generic numeric descriptor N followed by a numeric suffix of the form N-1, N-2 . . . N-m. To the extent that reference is made to the devices without regard to a specific one thereof, such device(s) will be referenced by the generic numeric descriptor N only.

The present invention discloses an enhanced optical network (PON) processor adapted to serve a plurality of PON applications. The processor is a highly integrated communications processor that can operate in different PON modes including, but not limited to, a GPON, a BPON, an EPON, or any combination thereof. In an exemplary embodiment of the present invention the provided PON processor is fabricated on a single integrated circuit (IC).

Figure 2:
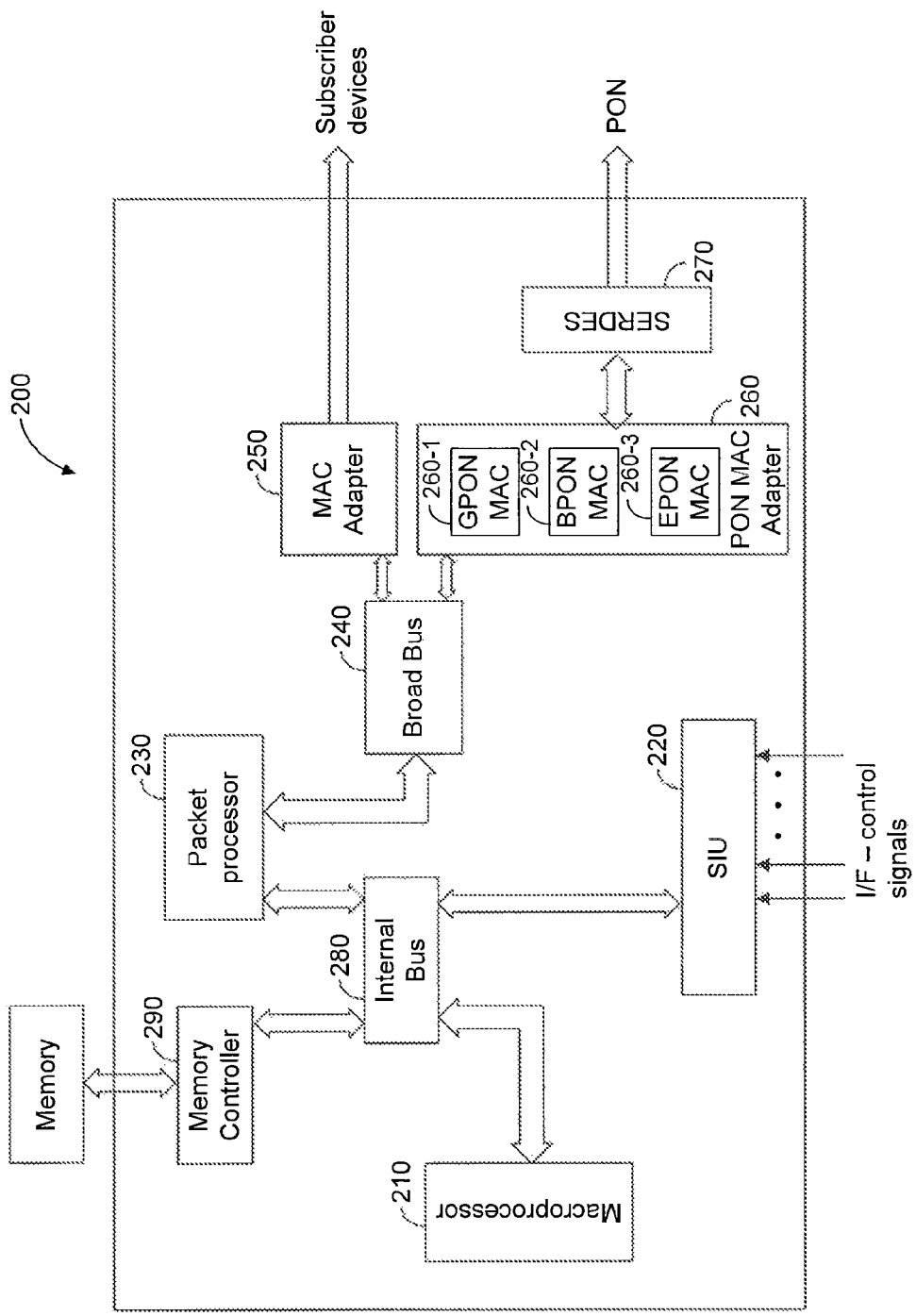
FIG. 2 is a diagram of the enhanced PON processor disclosed in accordance with an exemplary embodiment of the present invention.

Referring to FIG. 2, a non-limiting and exemplary diagram 200 of an enhanced PON processor disclosed in accordance with an embodiment of the present invention is shown. The PON processor 200 includes a microprocessor 210, a system integration unit (SIU) 220, a packet processor 230 coupled to a broad bus 240, an Ethernet media access control (MAC) adapter 250, a PON MAC adapter 260, and serial-deserial (SERDES) unit 270. The broad bus 240 may, for example, be configured according to U.S. Pat. No. 7,370,127 (Avishai et al.) filed Jun. 10, 12005 entitled "High-speed internal bus architecture for an integrated circuit" and commonly assigned to the present assignee. The U.S. Pat. No. 7,370,127 whose contents are incorporated herein by reference discloses an internal bus architecture capable of providing high speed inter-connection and inter-communication between modules connected in an integrated circuit (IC). The internal bus architecture includes multiple interface units for interfacing with the modules of the IC and at least one basic modular unit coupled to the interface units for allowing simultaneous data transfers between the interface units. Each of the basic modular units has an upload unit for transferring upstream data, and a download unit for transferring downstream data.

The PON MAC adapter 260 comprises at least one of a GPON MAC adapter 260-1, a BPON MAC adapter 260-2, and an EPON MAC adapter 260-3. The PON processor 200 further includes an internal bus 280 and a memory controller 290 that interacts with an external memory. The internal bus 280 allows the communication between the microprocessor 210, the SIU 220 and the packet processor 230.

The microprocessor 210 executes commands received from the packet processor 230. The microprocessor 210 performs fast processing, where the execution of each command is preferably completed in one clock cycle. In an exemplary embodiment of the present invention, the microprocessor 210 may be a high-performance MIPS 4KEC RISC microprocessor, with 16 Kbytes of two-way instruction cache and eight (8) Kbytes of two-way data cache. The SIU 220 provides both microprocessor 210 and packet processor 230 with interface and control signals.

The broad bus 240 interfaces between the Ethernet MAC adapter 250 as well as PON MAC adapter 260 and the packet processor 230. The broad bus 240 transfers its data at high rates and its architecture is based on a push-ahead mechanism, using a binary tree topology. The broad bus 240 supports parallelism in read and write transactions and allows simultaneous transfer of data from various units at the same time. A more detailed description of the broad bus 240 can be found in U.S. Pat. No. 7,370,127 commonly assigned to the same assignee as the present application, and whose contents are hereby incorporated by reference.

The Ethernet MAC adapter 250 includes a plurality of Ethernet interfaces for interfacing with a plurality of subscriber devices. These interfaces may be, but are not limited to, 100 Mbit Ethernet or 1 Gigabit Ethernet. The Ethernet MAC adapter 250 is capable of receiving upstream data flow from subscriber devices and transmitting downstream data to subscribers. Either upstream or downstream data flows are respectively forwarded to or received from the packet processor 230 via the broad bus 240.

The PON MAC adapter 260 is capable of processing traffic in accordance with the various PON modes that include, but are not limited to, a GPON, a BPON, an EPON, or any combination therefore. Specifically, the PON adapter 260 is adequate to serve the needs of a multi-service ONU operating in a point to multi point optical network. The GPON MAC adapter 260-1, the BPON MAC adapter 260-2, and the EPON MAC adapter 260-3 respectively support the GPON, BPON and EPON standards. It should be noted that the PON MAC adapter 260 ought to include at least one of the GPON, BPON, or EPON adapters. If two or more adapters are installed, then the PON processor 200 can be adapted to operate in a mixed-mode. An enhanced PON processor 200, configured to operate in a mixed-mode, allows service providers to easily upgrade their networks without any additional investments on infrastructure. One technique for upgrading the PONs is disclosed in U.S. Pat. No. 7,609,967 commonly assigned to the same assignee as the present application, and which is hereby incorporated by reference. Each of the MAC adapters 260-1, 260-2, and 260-3 includes a receiver to handle downstream data flow and a transmitter for handling upstream data flows. The operation of the PON MAC adapter 260 will be described in greater detail below. The SERDES unit 270 deserializes the data and converts it into a format compliant with the respective standard. The SERDES unit 270 also serializes data is before transmitting the data to the optical network.

The packet processor 230 is adapted to perform PON processing tasks, such as bridge learning, ATM queuing and shaping, reassembling of packets, and so on. Data processed by the packet processor 230 may be either an upstream flow, i.e., data sent from a subscriber device to an OLT or a downstream flow, i.e., data sent from an OLT to a subscriber device.

Figure 3:
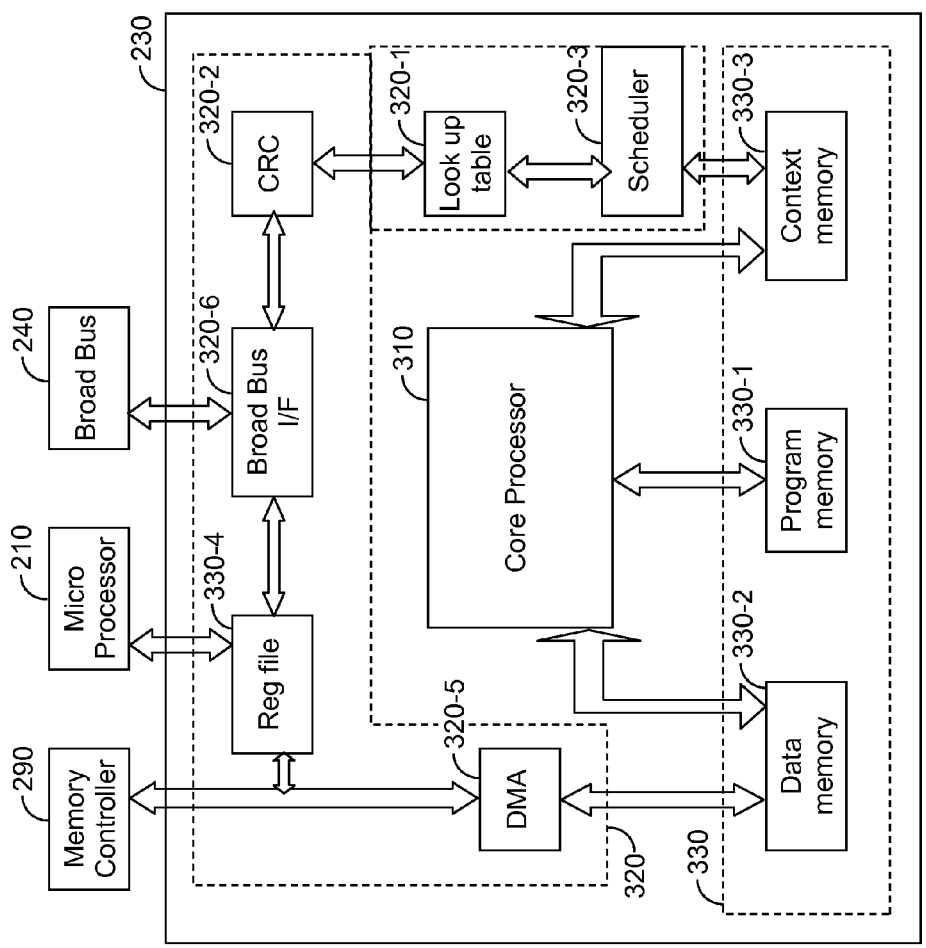
FIG. 3 is a diagram of the packet processor disclosed in accordance with an exemplary embodiment of the present invention.

FIG. 3 shows an exemplary block diagram of the packet processor 230 disclosed in accordance with an exemplary embodiment of the present invention. The packet processor 230 includes a core processor 310, a plurality of hardware (HW) accelerators 320-1 through 320-6, and a memory 330. The core processor 310 may be, for example, a RISC machine that is designed to execute processing tasks with minimal latency. For this purpose, all arithmetic and logic operations as well as source and destinations variables are registers based. The only operations that require access to the memory 330 are load and store operations. Furthermore, the core processor 310 is designed with separate channels utilized for program, data, and context accesses. Specifically, the memory units included in the memory 330 are high speed synchronous memories that are used for program, data and context. The program memory 330-1 is a read only memory that holds tasks' instructions. The program memory 330-1 is accessible by the microprocessor 210. The data memory 330-2 is a read/write memory that keeps data of the various tasks. The context memory 330-3 is a special memory that holds instances of registers used by core processor 310. When switching contexts, the previous context is saved in memory 330-3 and a new context is fetched. The context memory 330-3 is also accessible by the microprocessor 210.

The hardware accelerators 320 are dedicated hardware processing components designed to increase the packet processor 310 performance by speeding up time consuming tasks. These dedicated processing components including at least a lookup table 320-1, a cyclical redundancy checking (CRC) accelerator 320-2, a scheduler 320-3, a register file 320-4, a direct memory access (DMA) 320-5, and a board bus interface 320-6. The lookup table 320-1 includes MAC addresses used for access both PON and Ethernet MAC adapters 260 and 250. The CRC accelerator 320-2 enables the fast CRC calculation for data received through the PON. The CRC accelerator 320-2 operates off is line on data stored in data memory 330-2. The scheduler 320-3 receives requests from the different request generators and determines the next thread number when a context switch is triggered. The next thread is selected according to a predefined priority policy. The DMA 320-5 is responsible for data transfer from and to the memory 330 and an external memory. The register file 320-4 includes all configuration and input/output (I/O) space register. Configuration registers can be read and written by the microprocessor 210, while the input/output (I/O) registers are for the core processor 310 internal uses.

Figure 4:
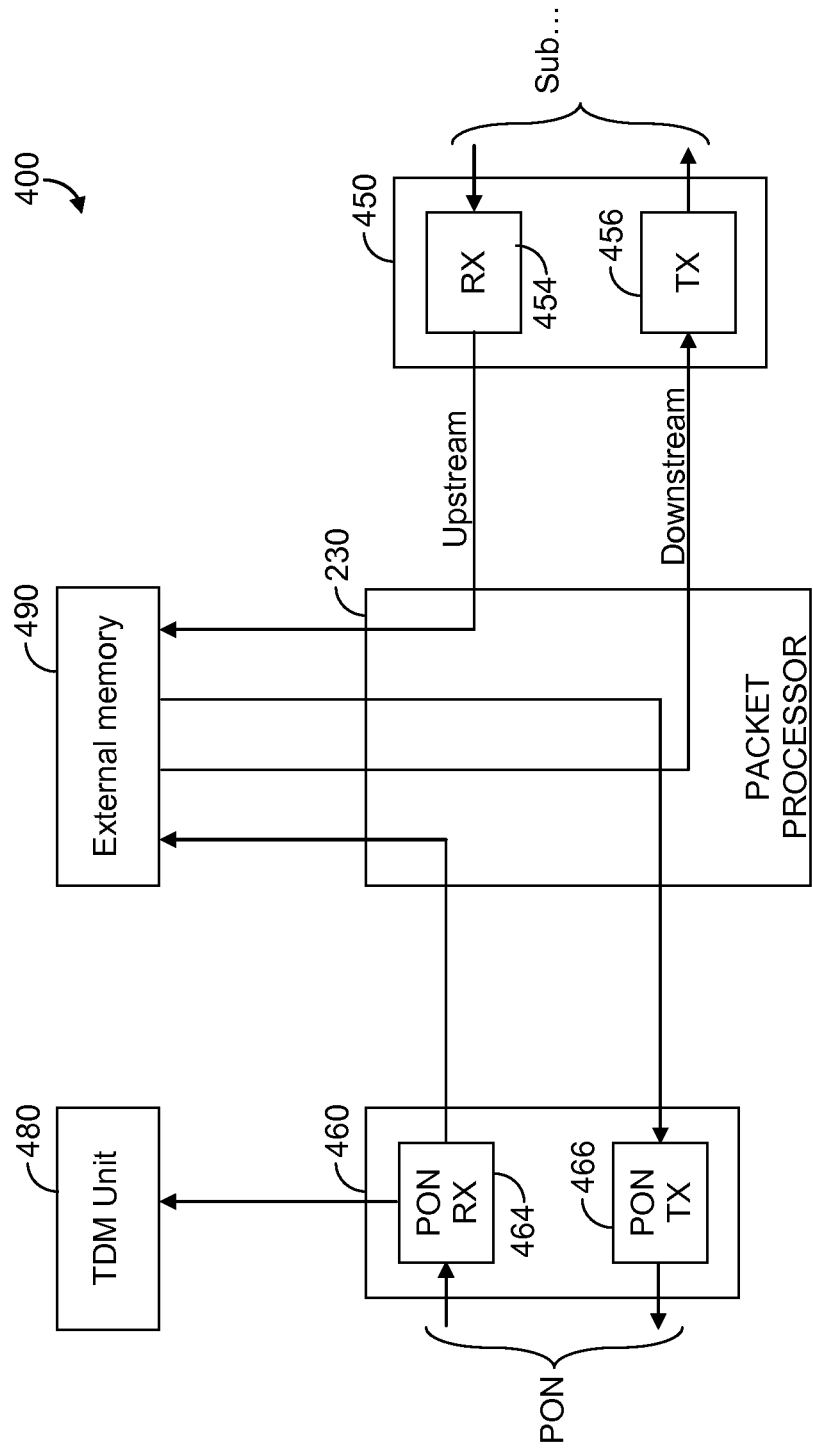
FIG. 4 is a block diagram used for demonstrating data flows in the enhanced PON processor.

Referring to FIG. 4, a non-limiting and exemplary block diagram 400 used for demonstrating data flows in the enhanced PON processor 200 is shown. The PON processor 200 can either receive data flowing downstream or transmit data upstream. As shown in diagram 400, downstream data is received at PON RX 464 of the PON MAC adapter 460 and transmitted to Ethernet TX 456 of the Ethernet MAC adapter 450 through packet processor 230. Similarly, upstream data is received at Ethernet RX 454 of the Ethernet MAC adapter 450 and is sent, via the packet processor 230, to PON TX 466 of the PON MAC adapter 460. Specifically, Ethernet or ATM payload units access the PON processor 230 through one of the ingress interfaces, i.e., PON RX 464 or Ethernet RX 454. First, the payload units are synchronized and error checking is performed and thereafter payload units are sent to the packet processor 230. When receiving data, the packet processor 230 reassembles payload units into packets in the external memory 490. Once a packet is ready in the external memory 490 it can be forwarded to the respective Ethernet TX 456. When transmitting data, the packet processor 230 sends the payload to the required egress unit of the PON TX 466.

The process described above is mainly used for handling Ethernet payloads. However, the present invention is further capable of handling, in a GPON mode, TDM payloads. A TDM downstream payload is sent directly from an ingress of the PON RX 464 to a TDM unit 480, namely without passing through the packet processor 230. Similarly, a TDM upstream payload is directly transferred from Ethernet RX 454 to the TDM unit 480.

Figure 5:
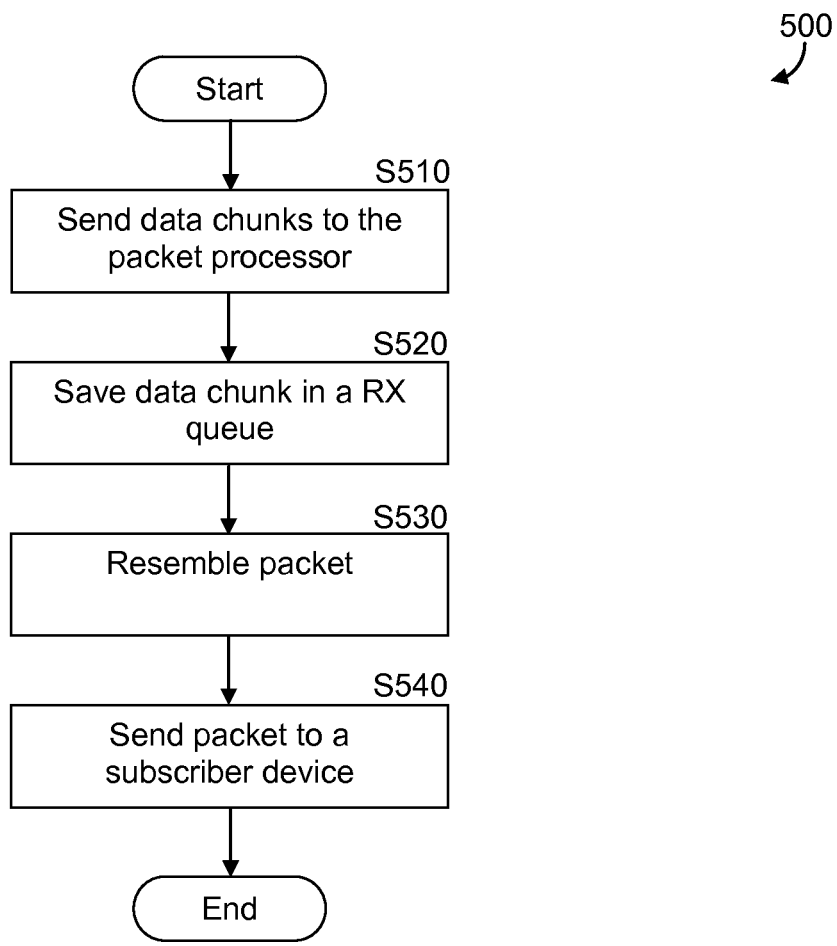
FIG. 5 is a flowchart used for describing the process for handling downstream data flows in accordance with an exemplary embodiment of the present invention.

Referring to FIG. 5, a non-limiting and exemplary flowchart 500 used for describing the process for handling downstream data flows in accordance with an embodiment of the present invention is shown. The process described herein refers to the components shown in FIGS. 3 and 4. The enhance PON processor 200 supports GPON, BPON or EPON flows. In BPON flows support ATM cell based transport to convey Ethernet service, while the GPON flow support two services Ethernet and TDM. At S510, ingress traffic from the PON RX 464 is sent to the packet processor 230. Specifically, each time a single data chunk is sent to the packet processor 230, which saves at S520 the data chunk in a RX queue in the data memory 330-2. In BPON a data chunk is an ATM cell. The RX queues in packet processor 230 are managed by the PON RX 464. That is, PON RX 464 fills the RX queues and takes care of congestion. At S530, data chunks are reassembled by packet processor 230 and temporally kept in the external memory 490.

Figure 6:
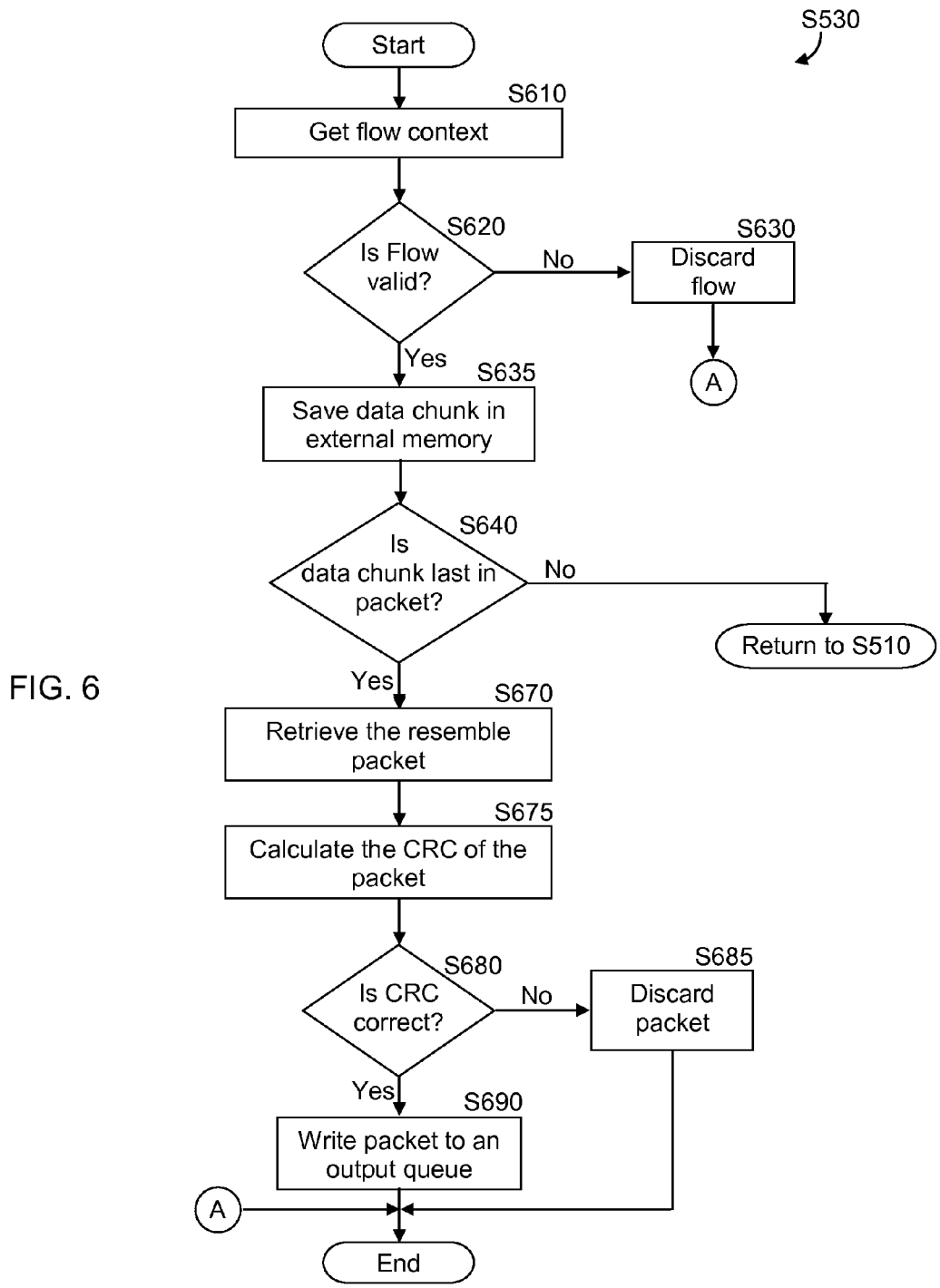
FIG. 6 is a flowchart describing the reassembly procedure in accordance with an exemplary embodiment of the present invention.

FIG. 6 shows the execution of S530 in greater detail. At S610, the flow context according to the flow-ID is retrieved from the context memory 330-3. At S620, a flow validity check is performed in order to determine the status of the flow, and if the flow is invalid then, at S630, the flow is discarded and execution terminates; otherwise, execution proceeds to S640. The validity check may be also performed by hardware filters (not shown) embedded in the PON MAC adapter 460. At S635, an incoming data chunk is saved in the external memory 490. At S640, another check is made to determine if the incoming data chunk is the last data chunk of a packet, and if so execution continues at S670; otherwise, execution returns to S510. If the data chunk is the last chunk of a packet, then at S670, the reassemble packet is retrieved and, at S675, the CRC of the packet is calculated by means of the CRC accelerator 320-2. At S680 the calculated CRC value is compared to a CRC value of the packet; and if the comparison result denotes inequality, then at S685 the packet is discarded and execution terminates; otherwise, at S690 the packet along with its descriptor is written to an output queue. Packets in the output queue are ready to be forwarded to Ethernet MAC TX 456. Once packet processor 230 writes the reassembled packet in the output queue, the packet processor 230 is ready to receive a new packet from PON RX 464.

Referring back to FIG. 5 where at S540 the packet is forwarded to MAC TX 456 which then transmits the packet to a subscriber device. The forwarding decision may be based on several criteria, such as the subscriber's MAC address, class of service (CoS), and so on.

In accordance with one embodiment, the PON processor 200 is capable of handling a plurality of downstream flows in parallel. The way multiple flows are handled in GPON or BPON is different. For example, in GPON the reassembly of multiple flows is entirely performed by the packet processor 230. The PON RX 464 only generates start flow and end flow per each Port-ID on which a flow is received. In BPON multiple downstream flows are supported by interleaving of ATM cells from different virtual channels (VCCs), i.e., cells having different flow-IDs. The flows reassembly (i.e., performing ATM Adaptation layer 5) is entirely executed by packet processor 230 and the PON RX 464 merely marks, per flow, the start of packet and end of packet cell.

Figure 7:
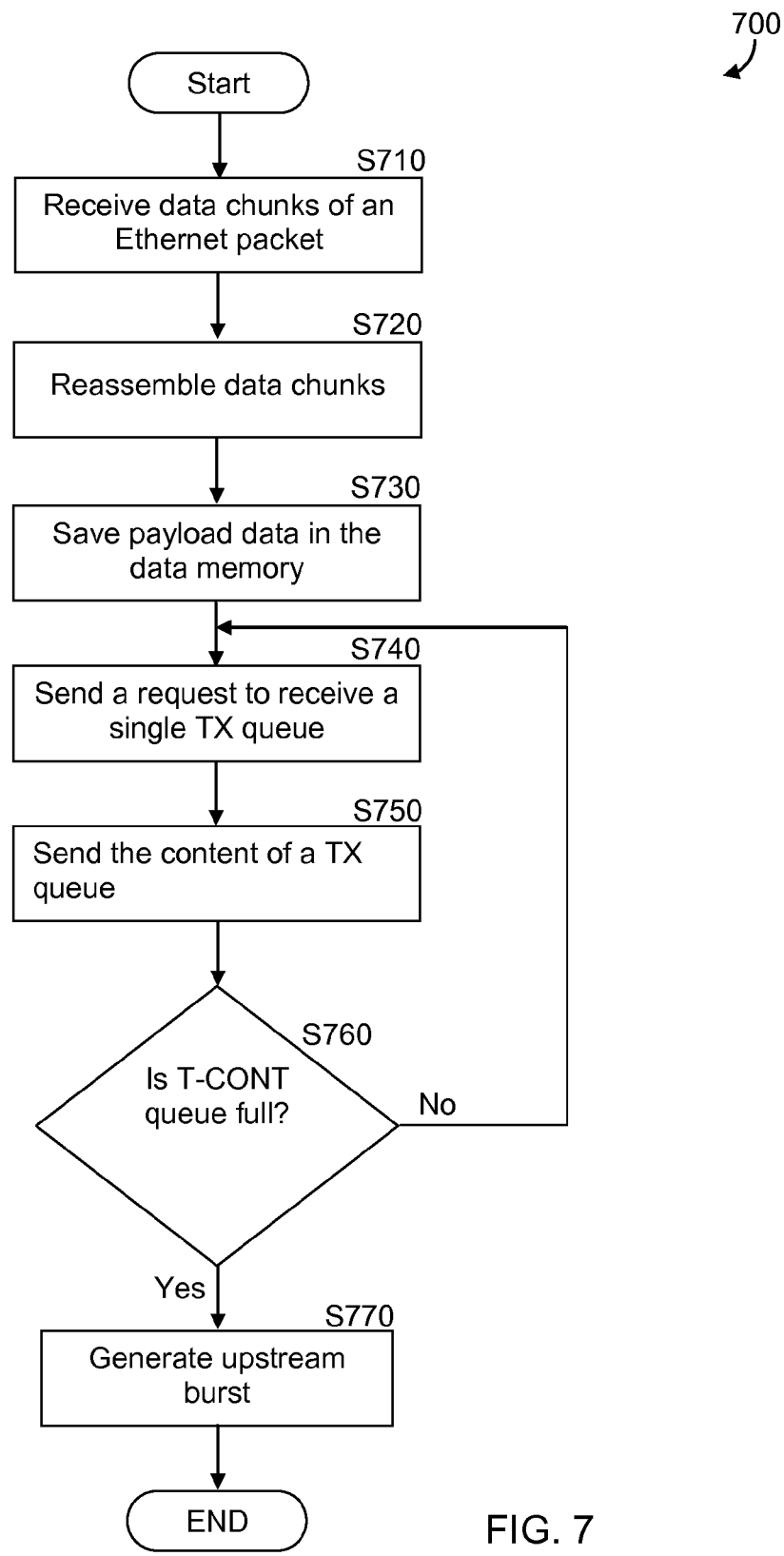
FIG. 7 is a flowchart used for describing the process for handling upstream data flows in accordance with an exemplary embodiment of the present invention.

Referring to FIG. 7, a non-limiting and exemplary flowchart 700 used for describing the process for handling upstream data flows in accordance with an embodiment of the present invention is shown. The method is described with reference to the components shown in FIGS. 3 and 4. The enhance PON processor 200 supports GPON, BPON or EPON flows. The BPON flows support ATM cell based transport to convey Ethernet service, while the GPON flows support two services Ethernet and TDM. The process begins, at S710, data chunks of an Ethernet frame are received and saved at the external memory 490. Ethernet packets are fragmented to data chunks by Ethernet PON 450 prior to transmission to packet processor 230. At S720, data chunks in external memory 490 are reassembled as described in detail above. At S730, the packet processor 230 retrieves the packets' payloads from the external memory 490 and saves the payloads in data memory 330-2. Specifically, payloads are ordered in the data memory 330-2 in TX queues. The TX queues are a set of prioritized queues, each of which represents a single priority queue that is connected to a specific T-CONT. A T-CONT is a virtual upstream channel to which bandwidth is granted by the OLT. A single T-CONT can be allocated for an ONU, a class of service (CoS), or a logical ONU. At S740, the PON TX 466 sends a request to the packet processor 230 to receive the content of a single TX queue. The PON TX 466 maintains the same number of T-CONT queues as the number of T-CONTs and cyclically requests for TX queues in order to fill a specific T-CONT queue. At S750, the content of a single TX queue is sent to the PON TX 466 and saved in the respective T-CONT queue. The contents of TX queues are sent according their priorities. At S760, it is checked if the T-CONT queue is full, and if so execution continues with S770; otherwise, execution returns to S740. At S770, upon receiving an upstream time slot for transmission, i.e., the specific T-CONT is granted, the PON TX 466 generates an upstream burst from data in the specific T-CONT queue and transmits it to the OLT.

The enhanced PON processor has been described with reference to a specific embodiment where the SIU 220, the broad bus 240, the SERDES unit 270, the internal bus 280, and the memory controller 290 are all independent components that are integrated in the processor 200. However, other embodiments will be apparent to those of ordinary skill in the art. For example, a PON processor may be capable of operating in a mixed mode without including all of these components, whose functionality components may be provided externally or internally by other means. Likewise, the functionality of these components may be integrated in the packed processor 230 or adapters 250 and 260. Moreover, the broad bus 240 may be replaced by any internal bus known in the art. Also, the SIU 220, the broad bus 240, and the SERDES unit 270 can be replaced by external devices, and the memory controller 290 can be removed by replacing the external memory with internal memory.

The invention claimed is:

1. A method for processing upstream data flows, comprising:
    receiving, by an optical network unit (ONU), data chunks of a payload sent from a subscriber device;
    reassembling, by the ONU, the data chunks into packets;
    storing, by the ONU, the packets in a plurality of queues;
    sensing a line-code and a line-rate active on a passive optical network (PON); and
    using a media access control (MAC) adapter to transmit the packets from the plurality of queues to an optical line terminal (OLT) over the PON, wherein the MAC adapter is selected from among a plurality of MAC adapters based on the line-code and the line-rate active on the PON.

2. The method of claim 1, wherein storing the packets in the plurality of queues comprises:
    storing, by the ONU, the packets into a corresponding traffic container (T-CONT) from among a plurality of T-CONTs.

3. The method of claim 2, further comprising:
    checking if a specific T-CONT from among the plurality of T-CONTs is full; and
    transmitting the packets from the specific T-CONT, using the MAC adapter, when the specific T-CONT is full.

4. The method of claim 3, wherein transmitting the packets from the specific T-CONT comprises:
    generating an upstream burst from the packets from the specific T-CONT when the specific T-CONT is full; and
    transmitting the upstream burst.

5. The method of claim 1, wherein the plurality of MAC adapters comprises at least:
    a Gigabit PON (GPON) MAC adapter;
    a broadband PON (BPON) MAC adapter; and
    an Ethernet PON (EPON) MAC adapter.

6. The method of claim 1, wherein storing the packets in the plurality of queues comprises:
    storing the packets in a corresponding traffic container (T-CONT) from among a plurality of T-CONTs, each T-CONT being associated with a corresponding virtual upstream channel from among a plurality of virtual upstream channels to which upstream time slot transmissions are granted.

7. A method for processing downstream data flows, comprising:
    sensing, by the ONU, a line-code and a line-rate active on a passive optical network (PON);
    using a media access control (MAC) adapter to receive data chunks from an optical line terminal (OLT) over the PON, wherein the MAC adapter is selected from among a plurality of MAC adapters based on the line-code and the line-rate active on the PON;
    storing, by the ONU, the data chunks in a plurality of queues;
    reassembling the data chunks from the plurality of queues into packets; and
    forwarding the packets to a subscriber device.

8. The method of claim 7, wherein reassembling the data chunks into the packets further comprises:
    checking the packets for correctness.

9. The method of claim 8, wherein checking the packets for correctness comprises at least one of:
    a cyclical redundancy checking (CRC) check and a flow validity check.

10. The method of claim 7, wherein the plurality of MAC adapters comprises at least:
    a Gigabit PON (GPON) MAC adapter;
    a broadband PON (BPON) MAC adapter; and
    an Ethernet PON (EPON) MAC adapter.

11. The method of claim 7, wherein each of the plurality of queues is associated with a corresponding virtual upstream channel from among a plurality of virtual upstream channels to which upstream time slot transmissions are granted.

12. An apparatus for processing data flows, comprising:
    a first adapter configured to receive data chunks of a payload sent from a subscriber device;
    a packet processor configured to reassemble data chunks received from the subscriber device into packets and store the packets in a plurality of queues; and
    a second adapter configured to transmit the packets from the plurality of queues to an optical line terminal (OLT) over a passive optical network (PON) using a media access control (MAC) adapter, wherein the MAC adapter is selected from among a plurality of MAC adapters based on a line-code and a line-rate active on the PON.

13. The apparatus of claim 12, wherein the plurality of queues comprises:
    a plurality of traffic containers (T-CONTs).

14. The apparatus of claim 13, wherein the second adapter is further configured to:
    check if a specific T-CONT from among the plurality of T-CONTs to which an upstream time slot transmission was received from an optical line terminal (OLT) is full; and
    transmit the packets from the specific T-CONT in accordance with its PON operating mode when the specific T-CONT is full.

15. The apparatus of claim 12, wherein the plurality of MAC adapters comprises at least:
- a Gigabit PON (GPON) MAC adapter;
- a broadband PON (BPON) MAC adapter; and
- an Ethernet PON (EPON) MAC adapter.

16. The apparatus of claim 12, wherein the plurality of queues comprises:
- a plurality of traffic containers (T-CONTs), each T-CONT from among the plurality of T-CONTs being associated with a corresponding virtual upstream channel from among a plurality of virtual upstream channels to which upstream time slot transmissions are granted.

\* \* \* \* \*